United States Patent
Ide

(10) Patent No.: US 8,331,766 B2
(45) Date of Patent: Dec. 11, 2012

(54) IMAGE SUPPLY APPARATUS, IMAGE SUPPLY SYSTEM, IMAGE SUPPLY METHOD, AND COMPUTER PROGRAM PRODUCT

(75) Inventor: Kentaro Ide, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 355 days.

(21) Appl. No.: 12/728,382

(22) Filed: Mar. 22, 2010

(65) Prior Publication Data

US 2010/0247076 A1 Sep. 30, 2010

(30) Foreign Application Priority Data

Mar. 26, 2009 (JP) ................................. 2009-075521

(51) Int. Cl.
*H04N 9/88* (2006.01)
(52) U.S. Cl. ....................................... 386/263; 386/264
(58) Field of Classification Search .................. 386/263, 386/264, 200, 219, 230, 248, 335
See application file for complete search history.

(56) References Cited

U.S. PATENT DOCUMENTS

| 2008/0052264 A1 | 2/2008 | Nasu et al. |
| 2009/0263102 A1* | 10/2009 | Shimada et al. ................ 386/94 |

FOREIGN PATENT DOCUMENTS

JP 2008-052026 A 3/2008

* cited by examiner

*Primary Examiner* — Robert Chevalier
(74) *Attorney, Agent, or Firm* — AdvantEdge Law Group, LLC

(57) ABSTRACT

An image supply apparatus that transmits data to an image display apparatus includes: a control section; and a storage section that stores video files, wherein the control section includes the functions of receiving specification information indicating video reproduction performance of the image display apparatus, accepting selection of a video file to be transmitted to the image display apparatus from the storage section, acquiring attribute information indicating an environment necessary for reproducing a video from the selected video file, comparing the specification information and the attribute information to determine whether or not the image display apparatus can reproduce the video file, outputting a warning when it is determined that the image display apparatus cannot reproduce the video file, transmitting data of the video file to the image display apparatus when it is determined that the image display apparatus can reproduce the video file.

4 Claims, 3 Drawing Sheets

IMAGE SUPPLY APPARATUS, IMAGE SUPPLY SYSTEM, IMAGE SUPPLY METHOD, AND COMPUTER PROGRAM PRODUCT

CROSS-REFERENCE

The present application claims priority from Japanese Patent Application No. 2009-075521 filed on Mar. 26, 2009, which is hereby incorporated by reference in its entirety.

BACKGROUND

In recent years, the use of contents has been increasing in which contents such as videos or music are downloaded from a server computer and reproduced by a portable terminal or a reproduction terminal such as a computer. In this case, when the reproduction terminal does not support the file format or bit rate of the contents, the contents cannot be reproduced.

Japanese Patent Publication No. 2008-52026 discloses a technique that when a reproduction terminal transmits to a computer the file format and bit rate of contents with which the reproduction terminal itself can reproduce, and the computer determines that contents to be transferred to the reproduction terminal cannot be reproduced with the transmitted file format and bit rate, the computer converts the file format and bit rate of the contents into those suitable for the reproduction terminal and transmits the contents to the reproduction terminal.

On the other hand, along with the widespread of projectors, not only the business use of them in companies or the like but also the private use at home or the like have been increasing. One usage form is that a computer or the like that supplies data (video, still image, or audio) and a projector are connected, the computer transmits data that the computer itself stores and can reproduce to the projector, and the projector reproduces the transmitted data.

However, in the case where the projector reproduces the data transmitted from the computer, when the specification of the projector is not adapted to the data, there arises a problem that the data cannot be displayed by the projector. Even in this case, the computer continues to transmit data to the projector because the computer itself can reproduce the data without problem. Accordingly, it is hard for a user to determine whether the cause that the data cannot be reproduced by the projector is the occurrence of trouble in the projector itself or a data format mismatch, which is problematic.

As disclosed in Japanese Patent Publication No. 2008-52026 in this case, the computer can convert the data format into one with which the projector can reproduce the data and transmit the same. However, when a video file is large, there arise problems that processing load on the computer side that converts the data format becomes large, and that a time for the processing is prolonged.

SUMMARY

Various embodiments may provide an image supply apparatus, an image supply system, an image supply method, and a computer program product, which are capable of determining whether or not the cause that a projector cannot reproduce lies on the side of a file to be used.

According to at least one embodiment of the disclosure, there is provided an image supply apparatus that transmits data to an image display apparatus, including: a control section; a storage section that stores video files; and an output section, wherein the control section includes a specification information receiving unit that receives specification information indicating video reproduction performance of the image display apparatus, a video file-selection accepting unit that accepts selection of a video file to be transmitted to the image display apparatus from the storage section, an attribute information acquiring unit that acquires attribute information indicating an environment necessary for reproducing a video from the selected video file, a determination unit that compares the specification information and the attribute information to determine whether or not the image display apparatus can reproduce the video file, a warning output unit that outputs a warning to the output device when the determination unit determines that the image display apparatus cannot reproduce the video file, and a transmission unit that transmits data of the video file to the image display apparatus when the determination unit determines that the image display apparatus can reproduce the video file.

It is preferable that the specification information include information relating to a codec, a resolution, and a bit rate of the image display apparatus, that the attribute information of the video file include information relating to a codec, a resolution, and a bit rate necessary for reproducing the video file, and that the determination unit determine that the video file can be reproduced by the image display apparatus when the codec of the attribute information matches the codec of the specification information, the resolution of the attribute information falls within a range of the resolution of the specification information, and the bit rate of the attribute information falls within a range of the bit rate of the specification information.

According to at least one embodiment of the disclosure, there is provided an image supply system including: an image display apparatus; and an image supply apparatus that is connected to the image display apparatus so that data can be transmitted and received therebetween, wherein the image display apparatus includes an image display control section, and a storage section that stores specification information indicating video reproduction performance of itself, the image display control section includes a unit that transmits the specification information to the image supply apparatus, and a unit that reproduces a video based on data transmitted from the image supply apparatus, the image supply apparatus includes an image supply control section, a storage section that stores video files, and an output section, and the image supply control section includes a specification information receiving unit that receives the specification information, a video file-selection accepting unit that accepts selection of a video file to be transmitted to the image display apparatus from the storage section, an attribute information acquiring unit that acquires attribute information indicating an environment necessary for reproducing a video from the selected video file, a determination unit that compares the specification information and the attribute information to determine whether or not the image display apparatus can reproduce the video file, a warning output unit that outputs a warning to the output device when the determination unit determines that the image display apparatus cannot reproduce the video file, and a transmission unit that transmits data of the video file to the image display apparatus when the determination unit determines that the image display apparatus can reproduce the video file.

According to at least one embodiment of the disclosure, there is provided an image supply method that transmits data to an image display apparatus, including: receiving specification information indicating video reproduction performance; accepting selection of a video file to be transmitted to the image display apparatus from video files stored by itself; acquiring attribute information indicating an environment necessary for reproducing a video from the selected video file; comparing the specification information and the attribute information to determine whether or not the image display apparatus can reproduce the video file; outputting a warning when it is determined that the image display apparatus cannot reproduce the video file; transmitting data of the video file to the image display apparatus when it is determined that the image display apparatus can reproduce the video file.

According to at least one embodiment of the disclosure, there is provided a program for causing a computer connected to an image display apparatus so that data can be transmitted and received therebetween to execute: receiving specification information indicating video reproduction performance of the image display apparatus; accepting selection of a video file to be transmitted to the image display apparatus from video files stored by itself; acquiring attribute information indicating an environment necessary for reproducing a video from the selected video file; comparing the specification information and the attribute information to determine whether or not the image display apparatus can reproduce the video file; outputting a warning when it is determined that the image display apparatus cannot reproduce the video file; and transmitting data of the video file to the image display apparatus when it is determined that the image display apparatus can reproduce the video file.

According to the embodiments, the image display apparatus can reliably supply reproducible data, and the image supply apparatus outputs a warning when the image display apparatus cannot reproduce video data. Therefore, a user can easily know the cause.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereinafter, a preferred embodiment of the disclosure will be described in detail with reference to the accompanying drawings.

Figure 1:
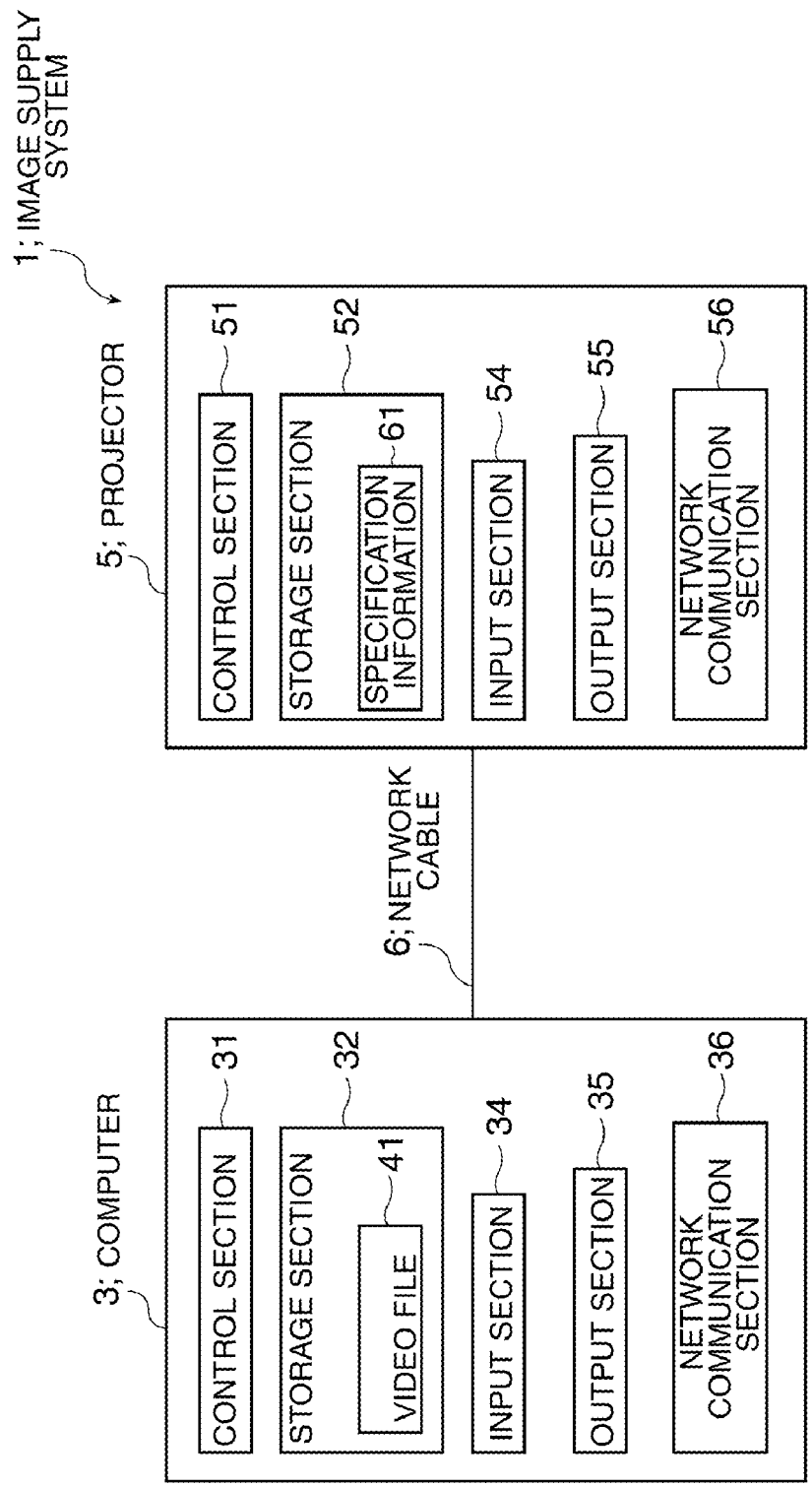
FIG. 1 is a hardware block diagram of an image supply system according to an embodiment of the invention.

FIG. 1 is a schematic block diagram of an image supply system 1. The image supply system 1 includes a computer 3 as an image supply apparatus and a projector 5 as an image display apparatus. The computer 3 and the projector 5 are connected to each other through a network cable 6 so that data can be transmitted and received therebetween. The network cable 6 may be a local area network (LAN) cable or a universal serial bus (USB) cable.

The computer 3 has a control section 31, a storage section 32, an input section 34, an output section 35, and a network communication section 36. The control section 31 is a central processing unit (CPU) or a microprocessor, controls each of the sections of the computer 3, and performs processing described later. The storage section 32 is a storage device such as, for example, a nonvolatile memory, a volatile memory, or a hard disk and stores a video file 41 and programs executing processing described later.

The video file 41 includes header information and video data. The header information includes information (attribute information) relating to a video reproduction environment necessary for reproducing the video data, such as the codec, resolution, or bit rate of the video data.

Video data is compressed in most cases. A codec is compression and decompression software necessary for decompressing compressed video data (video data or audio data). There are various codecs, such as MPEG-4v3 or DivX (registered trademark), corresponding to respective compression standards such as MPEG-2 or MPEG-4.

Resolution is a value representing the number of pixels of the data, which is indicated by the number of dots, and is information such as 800×600 dots, for example, in this case.

Bit rate is a value representing how much amount of information of compressed video data is transmitted or received per second and is information such as 8 Mbps, for example.

The input section 34 is an input device such as a keyboard or a mouse and accepts input of instruction data for selecting a video file to be transmitted to the projector 5 from video files. The output section 35 is an output device such as a display device or a speaker. The network communication section 36 transmits and receives data with the projector 5 through the network cable 6.

The projector 5 has a control section 51, a storage section 52, an input section 54, an output section 55, and a network communication section 56. The control section 51 is a central processing unit (CPU) or a microprocessor, controls each of the other sections, and performs processing described later.

The storage section 52 is a storage device such as, for example, a nonvolatile memory, a volatile memory, or a hard disk, and stores specification information 61.

The specification information 61 is information including a codec of the projector 5, a resolution representing a display ability of the projector, and a bit rate representing the data amount that the projector 5 can reproduce per unit time, which relates to video reproduction performance (video reproduction specification) of the projector 5. For example, examples of the specification information 61 of the projector 5 include "MPEG-2 codec; a resolution of 720×576 dots; and a bit rate of 8 Mbps" and "HD codec; a resolution of 1440× 1024 dots; and a bit rate of 20 Mbps".

The input section 54 is an input device such as an operation button for operating the projector 5. The output section 55 is an output device such as a projection device or a speaker. The network communication section 56 is a device that transmits and receives data with the computer 3 through the network cable 6.

Figure 2:
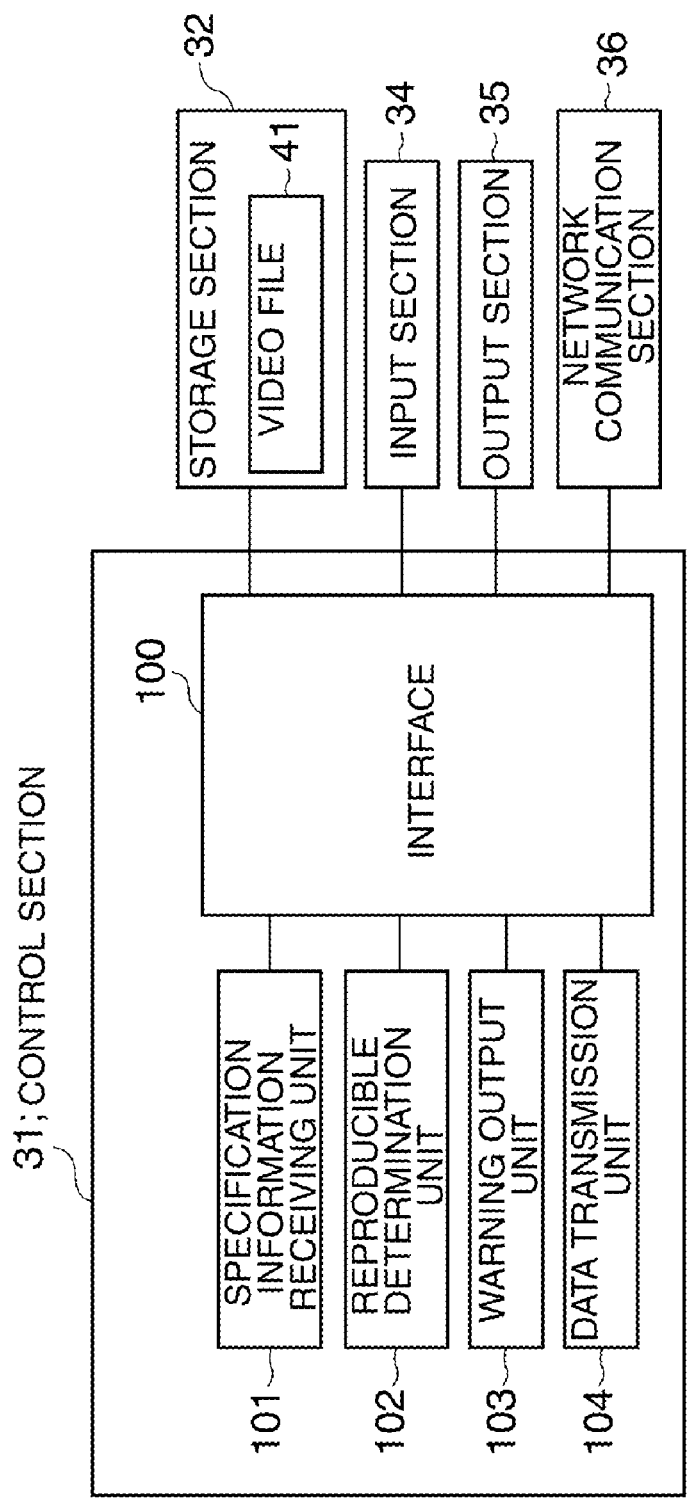
FIG. 2 is a functional block diagram of an image supply apparatus according to the embodiment.

FIG. 2 is a functional block diagram of the control section 31 of the computer 3.

The control section 31 has an interface 100, a specification information receiving unit 101, a reproducibility determination unit 102, a warning output unit 103, and a data transmission unit 104.

The storage section 32, the input section 34, the output section 35, and the network communication section 36 of the computer 3 are connected to the specification information receiving unit 101, the reproducibility determination unit 102, the warning output unit 103, and the data transmission unit 104 as respective processing functional units through the interface 100 and perform processing.

The specification information receiving unit 101 receives the specification information 61 transmitted from the projector 5 through the network communication section 36. The reproducibility determination unit 102 compares attribute information of the video file 41 requested to be reproduced by a user and the specification information 61 to determine whether or not the video file 41 can be reproduced in the projector 5. When the reproducibility determination unit 102 determines that the video file 41 cannot be reproduced in the projector 5, the warning output unit 103 outputs a warning that notifies a user of that effect from the output section 35. When the reproducibility determination unit 102 determines that the video file 41 can be reproduced in the projector 5, the data transmission unit 104 transmits data of the video file 41 to the projector 5.

Next, the operation of the image supply system 1 will be described.

In this case, an example is described in which a user connects the computer 3 with the projector 5 through the network cable 6 and requests to reproduce the video file 41 stored in the computer 3 by the projector 5.

Figure 3:
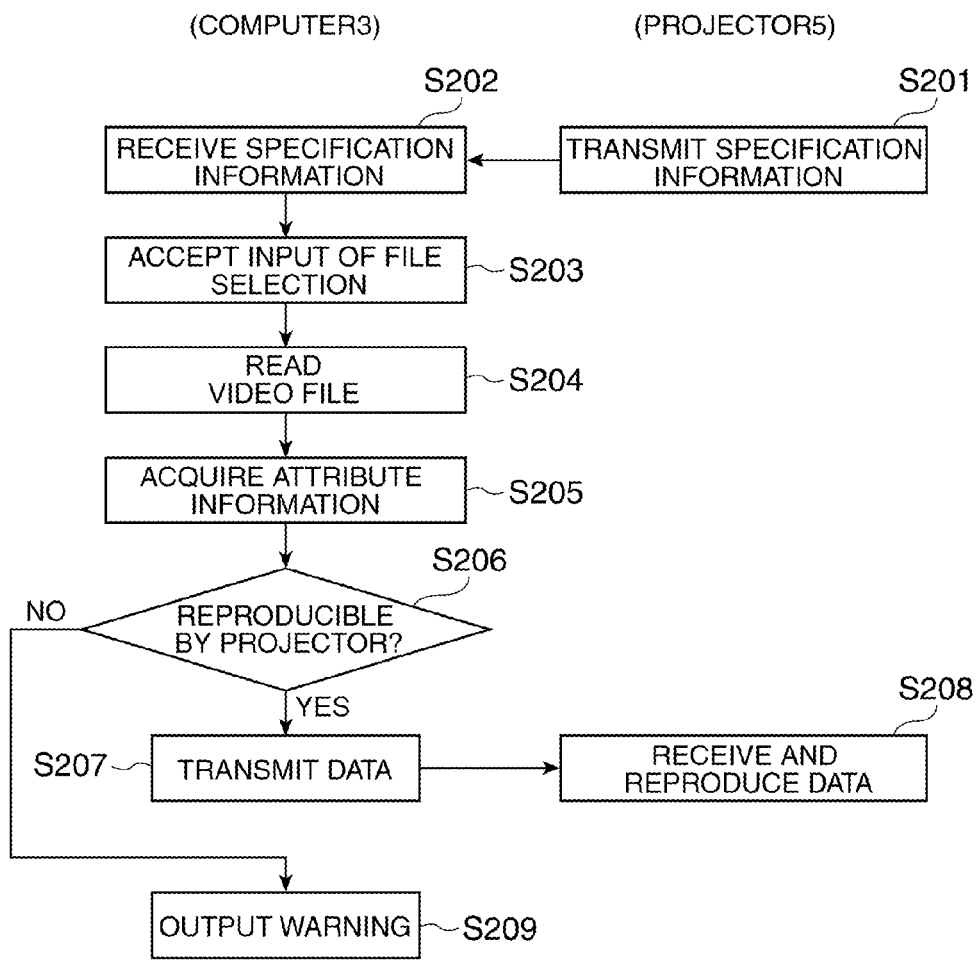
FIG. 3 is a sequence diagram showing a flow of processing of the image supply system according to the embodiment.

FIG. 3 is a sequence diagram showing a flow of processing of the image supply system 1.

When the connection between the computer 3 and the projector 5 is confirmed, the control section 51 of the projector 5 reads the specification information 61 from the storage section 52 and transmits the same from the network communication section 56 to the computer 3 (Step S201).

The specification information receiving unit 101 of the control section 31 of the computer 3 receives the specification information 61 through the network communication section 36 (Step S202). The computer 3 accepts input of selecting the video file 41 by a user from the input section 34 (Step S203). In this case, the control section 31 displays a list screen of video files stored in the storage section 32 on a display. A user selects a video file desired to be reproduced by the projector 5 with a mouse or the like.

The reproducibility determination unit 102 of the control section 31 reads the selected video file 41 (Step S204) and acquires attribute information from the header information of the video file 41 (Step 205). The reproducibility determination unit 102 compares the acquired attribute information of the video file 41 and the specification information 61 of the projector 5 to determine whether or not the video file 41 can be reproduced by the projector 5 (Step S206).

As described above, the specification information 61 is the information relating to the video reproduction performance of the projector 5, such as a codec, a resolution, and a bit rate of the projector 5, while the attribute information of the video file 41 is the information relating to a codec, a resolution, and a bit rate necessary for reproducing the video file 41.

In Step S206, when the codec of the attribute information of the video file 41 matches the codec of the specification information 61, the resolution of the attribute information of the video file 41 falls within a range of the resolution of the specification information 61, and the bit rate of the attribute information of the video file 41 falls within a range of the bit rate of the specification information 61, the reproducibility determination unit 102 determines that the video file 41 can be reproduced by the projector 5. In other cases, the reproducibility determination unit 102 determines that the video file 41 cannot be reproduced.

When the reproducibility determination unit 102 determines that the video file 41 can be reproduced by the projector 5 ("Yes" in Step S206), the data transmission unit 104 transmits the data of the video file 41 from the network communication section 36 (Step S207). The projector 5 receives the transmitted data with the network communication section 56. The control section 51 stores the data in the storage section 52 such as a data buffer, reads the data by using the codec of itself, and outputs the data to the output section 55 to reproduce a video (Step S208). The processing in Steps S207 and S208 is repeatedly performed until all the data of the video file 41 are transmitted and reproduced.

When the reproducibility determination unit 102 determines that the video file 41 cannot be reproduced by the projector 5 ("No" in Step S206), the warning output unit 103 outputs a warning to the output section 35 (Step S209). When it is determined that the video file 41 cannot be reproduced by the projector 5, the warning output unit 103 displays, for example, on the display of the computer 3 a warning that says, "This video file is not adapted to the projector", or "A codec necessary for reproducing this video file does not exist in the projector". Moreover, a warning beep may be output from a speaker or the like.

According to the embodiment as described above, since the computer 3 reliably transmits the data of the video file 41 conforming to the specification information 61 of the projector 5, the video file can be reliably reproduced in the projector 5. When the video file 41 does not conform to the specification information 61 of the projector 5, that is, when the projector 5 cannot reproduce the video file 41, the computer 3 outputs a warning. Therefore, a user can easily know the cause that the projector 5 does not reproduce a video.

In the embodiment, data of a video file has been described as an example. However, the embodiment is applicable even when data transmitted from the computer 3 to the projector 5 is image data or audio data.

It is also possible to realize an image supply apparatus by preparing a program realizing the processing in each of the specification information receiving unit 101, the reproducibility determination unit 102, the warning output unit 103, and the data transmission unit 104 described above and reading the program by a general-purpose computer. The program may be recorded on a recording medium such as a CD-ROM to be distributed or may be distributed through a network.

What is claimed is:

1. An image supply apparatus that transmits data to an image display apparatus, comprising:
 a storage section that stores video files;
 an output section; and
 a control section including
  a specification information receiving unit that receives specification information from the image display apparatus including a codec, a resolution, and a bit rate supported by the image display apparatus,
  a video file-selection accepting unit that accepts a selection of a video file from the video files to be transmitted to the image display apparatus from the storage section,
  an attribute information acquiring unit that acquires attribute information of the selected video file from the image supply apparatus, the attribute information including a codec, a resolution, and a bit rate required for reproducing a video from the selected video file,
  a determination unit that compares the specification information and the attribute information and determines that the video file is not reproducible by the image display apparatus unless the codec of the attribute information matches the codec of the specification information, the resolution of the attribute information falls within a predetermined range of the resolution of the specification information, and the bit rate of the attribute information falls within a predetermined range of the bit rate of the specification information,
  a warning output unit that outputs a warning through the output section when the determination unit determines that the video file is not reproducible by the image display apparatus, and a transmission unit that transmits data of the video file to the image display apparatus when the determination unit determines that the video file is reproducible by the image display apparatus.

2. An image supply system comprising:

an image display apparatus; and the image supply apparatus in accordance with claim 1 that is connected to the image display apparatus so that the data can be transmitted and received therebetween, wherein the image display apparatus includes
   an image display control section, and
   a storage section that stores the specification information of the image display apparatus, the image display control section includes
   a unit that transmits the specification information to the image supply apparatus, and
   a unit that reproduces a video based on the data transmitted from the image supply apparatus.

3. An image supply method that transmits data to an image display apparatus, comprising:

receiving specification information from the image display apparatus including a codec, a resolution, and a bit rate supported by the image display apparatus;

accepting a selection of a video file to be transmitted to the image display apparatus from video files stored by an image supply apparatus;

acquiring attribute information of the selected video file from the image supply apparatus, the attribute information including a codec, a resolution, and a bit rate required for reproducing a video from the selected video file;

comparing the specification information and the attribute information;

determining that the video file is not reproducible by the image display apparatus unless the codec of the attribute information matches the codec of the specification information, the resolution of the attribute information falls within a predetermined range of the resolution of the specification information, and the bit rate of the attribute information falls within a predetermined range of the bit rate of the specification information;

outputting a warning when it is determined that the video file is not reproducible by the image display apparatus;

transmitting data of the video file to the image display apparatus when it is determined that the video file is reproducible by the image display apparatus.

4. A computer program product embodied in at least one non-transitory computer readable medium and comprising computer instructions executable by a computer connected to an image display apparatus so that data can be transmitted and received therebetween, the computer instructions directing the computer to execute:

receiving specification information from the image display apparatus including a codec, a resolution, and a bit rate supported by the image display apparatus;

accepting a selection of a video file to be transmitted to the image display apparatus from video files stored by the computer;

acquiring attribute information of the selected video file from the computer, the attribute information including a codec, a resolution, and a bit rate required for reproducing a video from the selected video file;

comparing the specification information and the attribute information;

determining that the video file is not reproducible by the image display apparatus unless the codec of the attribute information matches the codec of the specification information, the resolution of the attribute information falls within a predetermined range of the resolution of the specification information, and the bit rate of the attribute information falls within a predetermined range of the bit rate of the specification information;

outputting a warning when it is determined that the video file is not reproducible by the image display apparatus; and transmitting data of the video file to the image display apparatus when it is determined that the video file is reproducible by the image display apparatus.

* * * * *